(12) United States Patent
Van Steijn et al.

(10) Patent No.: US 12,185,730 B2
(45) Date of Patent: Jan. 7, 2025

(54) METHOD AND SYSTEM FOR REHANGING POULTRY, AND A SHACKLE FOR SUSPENDING THE POULTRY

(71) Applicant: Meyn Food Processing Technology B.V., Oostzaan (NL)

(72) Inventors: Aloysius Christianus Maria Van Steijn, Oostzaan (NL); Rick Sebastiaan Van Stralen, Oostzaan (NL); René Gerardus Hendricus Al, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 53 days.

(21) Appl. No.: 18/196,848

(22) Filed: May 12, 2023

(65) Prior Publication Data

US 2023/0363401 A1 Nov. 16, 2023

(30) Foreign Application Priority Data

May 13, 2022 (NL) ...................................... 2031855

(51) Int. Cl.
*A22C 21/00* (2006.01)
(52) U.S. Cl.
CPC ...... *A22C 21/0007* (2013.01); *A22C 21/0053* (2013.01)
(58) Field of Classification Search
CPC .......................... A22C 21/0007; A22C 21/0053
USPC ........................................................ 452/187
See application file for complete search history.

(56) References Cited

U.S. PATENT DOCUMENTS

| | | | | |
|---|---|---|---|---|
| 4,283,813 A * | 8/1981 | House | ................ | A22C 21/0053 452/106 |
| 4,354,296 A * | 10/1982 | Robinson | ........... | A22C 21/0015 452/53 |
| 4,964,194 A * | 10/1990 | Kessler | .............. | A22C 21/0023 452/167 |
| 8,641,487 B1 * | 2/2014 | Ray | .................... | A22C 21/0023 452/149 |
| 2020/0037624 A1 * | 2/2020 | Van Steijn | ............. | B65G 17/20 |

FOREIGN PATENT DOCUMENTS

WO WO 00/41568 A2 7/2000
WO WO 2014/026695 A1 2/2014

OTHER PUBLICATIONS

NL Search Report, Dec. 15, 2022.

* cited by examiner

*Primary Examiner* — Richard T Price, Jr.
(74) *Attorney, Agent, or Firm* — Dority & Manning, P.A.

(57) ABSTRACT

A system and method for rehanging poultry suspended by the head in a first shackle of a first shackle conveyor to a second shackle of a second shackle conveyor in which the poultry is or will be suspended by the legs. A leg positioning unit may be arranged to support the poultry at the legs while the poultry is maintained suspended by the head in the first shackle of the first shackle conveyor. A movable takeover unit operates on the legs of the poultry and is movable towards the second shackle of the second shackle conveyor to move the legs of the poultry into the second shackle of the second shackle conveyor.

21 Claims, 11 Drawing Sheets

METHOD AND SYSTEM FOR REHANGING POULTRY, AND A SHACKLE FOR SUSPENDING THE POULTRY

PRIORITY STATEMENT

The present application claims priority under 35 U.S.C. § 119 to Dutch Patent Application No. 2031855, filed on May 13, 2022.

FIELD OF THE INVENTION

The subject matter of the present disclosure relates generally to a method and system for rehanging poultry that is suspended by the head in a first shackle of a first shackle conveyor to a second shackle of a second shackle conveyor in which the poultry is or will be suspended by the legs. The subject matter also relates to a shackle for suspending poultry.

BACKGROUND OF THE INVENTION

WO2014/026695 relates to a method and system for suspending a bird by the legs from a shackle, wherein the following sequence of steps are executed: 1) bending at least one leg at the ankle joint so that the foot comes nearer to the breast of the bird, 2) inserting the leg in a shackle, 3) at least partially releasing the leg. The bending of the leg may be achieved by arranging an engagement member at the breast side of the leg to hinder a movement of the ankle joint towards the breast of the bird and using a carrier for forcing the foot towards the breast. The bending at the ankle joint results in a pull on tendons and muscles in the legs, which in turn causes the digits to come closer together and the foot to clench. An even tighter clenching may be achieved by extending the knee joint. This bending of the legs of the birds so that the digits come together is required in the prior art to provide that the feet take considerably less space and the legs are easier to introduce in the openings of the shackle from which the poultry will be suspended by the legs.

WO00/41568 relates to a system for rehanging poultry which is suspended by the head in a first shackle of a first shackle conveyor to a second shackle of a second shackle conveyor in which the poultry is or will be suspended by the legs, wherein the system includes a leg positioning unit arranged to support the poultry at the legs while the poultry is maintained suspended by the head in the first shackle of the first shackle conveyor, and wherein the system includes a movable takeover unit which is movable towards the second shackle of the second shackle conveyor for moving the legs of the poultry into the second shackle of the second shackle conveyor, wherein the movable takeover unit is arranged to be operational at least when the leg positioning unit supports the poultry at the legs.

BRIEF DESCRIPTION OF THE INVENTION

Aspects and advantages of the invention will be set forth in part in the following description, or may be obvious from the description, or may be learned through practice of the invention.

In one exemplary aspect, an object of the invention is to provide an effective and flexible method and system for automatically rehanging poultry that is suspended by the head, into poultry which will be suspended by the legs. The system of WO2014/026695 does not provide this capability. The system of WO00/41568 lacks flexibility and is unsuited for high processing rates.

In another exemplary aspect, an object of the invention is to provide such a method and system which is reliable, does not require much maintenance, and is well-equipped to cope with high processing rates in the rehanging operation.

The exemplary methods and systems of the invention are therefore provided with the features of one or more of the appended claims. In another exemplary embodiment, the invention is also embodied in a shackle as defined by the claims.

In an exemplary embodiment of the invention, the movable takeover unit is independently and separate from the leg positioning unit movable towards the second shackle of the second shackle conveyor and is arranged to act directly on the legs of the poultry to move the legs of the poultry into the second shackle of the second shackle conveyor. This exemplary system of the invention can enable a complete automated method of rehanging wherein the poultry is first suspended by the head and is converted into being suspended by the legs, and wherein first a supporting of the poultry at the legs is carried out while the poultry is maintained suspended by the head in the first shackle of the first shackle conveyor, then an of engaging the legs of the poultry is carried out with the movable takeover unit acting directly on the legs when the poultry is supported at the legs, and a moving of the movable takeover unit that are directly acting on the legs towards the second shackle of the second shackle conveyor to move the legs of the poultry into the second shackle of the second shackle conveyor.

In one exemplary aspect, the leg positioning unit includes a hook arranged to engage the legs of the poultry while suspended by the head. A hook is a well-known device in the poultry industry and is a robust instrument to perform the leg positioning operation.

Suitably the hook of the leg positioning unit can be arranged to follow an essentially circular path in approaching the legs to eventually engage the legs of the poultry, which circular path terminates at a position where the legs of the poultry extend obliquely or sideways away from where the poultry is suspended by the head. When the legs of the poultry extend obliquely or sideways away they are in an appropriate position to be further engaged by the movable takeover unit, as detailed hereinafter.

In another exemplary embodiment, the movable takeover unit is arranged to engage the legs of the poultry in an upward movement of the takeover unit ending adjacent to where the leg positioning unit engages the legs of the poultry. Accordingly, the takeover unit can engage the legs of the poultry in a well-defined position, which is desirable in an automated operation as envisaged by the invention.

The leg positioning unit and/or the movable take-over unit can be configured to engage the legs at or near the ankle at the ankle's front side, preferably above the ankle at a drum side of the legs. Accordingly, a certain bending of the legs is caused which can be helpful in correctly orienting the legs when the legs are later in the rehanging method moved by the takeover unit to the shackle from which the poultry will be suspended.

To enable easy movement of the poultry legs by the takeover unit later in a later instance to the shackle, the movable takeover unit can be configured for engaging the legs at a position which is more distant from the first shackle where the poultry is suspended by the head, than the distance of the leg positioning unit to the first shackle while the leg positioning unit is engaging the legs of the poultry.

Suitably the movable takeover unit may be provided with first slits for receiving therein the legs of the poultry.

In another exemplary embodiment, the movable takeover unit can be provided with restricting elements for preventing removal of the legs from the first slits of the movable takeover unit. This secures that the poultry legs are not lost once the suspension of the poultry by the head is released, which causes the poultry to flip to a headdown orientation. Correspondingly, the system can be arranged to release the head from the first shackle after the movable takeover unit has engaged the legs of the poultry, and more preferably that the system is arranged to release the head from the first shackle after the restricting elements of the movable takeover unit are actuated to prevent removal of the legs from the first slits in which the legs of the poultry are received.

In still further exemplary aspects, the movable takeover unit can be arranged to move the legs of the poultry towards the second shackle of the second shackle conveyor in an essentially horizontal motion. Mechanization of the motion is then easily accomplished.

In another embodiment, the system can include the second conveyor, which is provided with a series of second shackles.

The second shackle can be provided with essentially vertical slits for receiving and retaining the legs of the poultry, wherein the movable takeover unit is arranged to move downwards after the movable takeover unit with the legs of the poultry has been moved towards the second shackle of the second shackle conveyor, so as to move the legs for their retainment down into the essentially vertical slits of the second shackle.

In particular wherein the second shackle includes an upper horizontal rod distant from and above the second slits, the movable take-over unit may be arranged to move the feet extending from the legs above and beyond the upper horizontal rod, and then to move the legs downwards so that the feet engage the upper horizontal rod and the toes of the feet are moved into the second shackle prior to movement of the legs into the essentially vertical second slits of the second shackle. The movable takeover unit may be arranged to move the legs in the downward movement into the second slits once the toes are securely arranged within the second shackle. Accordingly, in an exemplary method of the invention, the movable takeover unit may be moved downwards after the movable takeover unit has moved the legs of the poultry above the second shackle of the second shackle conveyor such that the feet extending from the legs of the poultry project beyond the upper horizontal rod of the second shackle, so as to assume a proper starting position for subsequently moving the legs for their retainment down into the second shackle. During the downward movement of the takeover unit, the feet are first engaging the upper horizontal rod of the second shackle and by the continued downward movement of the takeover unit the toes of the feet are arranged to enter into the second shackle. In this way, the risk that the legs will eventually not move into the essentially vertical slits of the second shackle can be reduced.

In another exemplary aspect, a conventional second shackle can be used for suspending the poultry by the legs. Such a conventional shackle may include a central vertical bar, wherein on a lower end of the central vertical bar and connected to the central vertical bar, two first rods diverge away from each other and connect to a lower horizontal rod distant from the central bar, wherein on opposite ends of the lower horizontal rod, the horizontal rod bends into two upwardly extending second rods that eventually connect to the central vertical bar, and wherein the two first rods and the two second rods may delimit and define slits between the two first rods and the two second rods for receiving and retaining the legs of poultry suspended by the legs from the second shackle.

Rather than using a conventional second shackle, in another exemplary embodiment, a shackle is used wherein the two upwardly extending second rods can merge into an upper horizontal rod distant from the lower horizontal rod, which upper horizontal rod is fixed in position at a predetermined distance from the central vertical bar. Accordingly, it can be easier to move the legs of the poultry into the second shackle when the movable takeover unit moves downwards following its motion towards the second shackle, during which downward movement the legs of the poultry are moved for their retainment down into the essentially vertical slits of the second shackle.

Suitably the upper horizontal rod of the shackle can be connected to the central vertical bar with an intermediate connection piece.

These and other features, aspects and advantages of the present invention will become better understood with reference to the following description and appended claims. The accompanying drawings, which care incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of a sequence of operations of an exemplary embodiment of a system for rehanging poultry according to the invention that is not limiting as to the appended claims.

Whenever in the figures the same reference numerals are applied, these numerals refer to the same parts.

DETAILED DESCRIPTION

Figure 1:
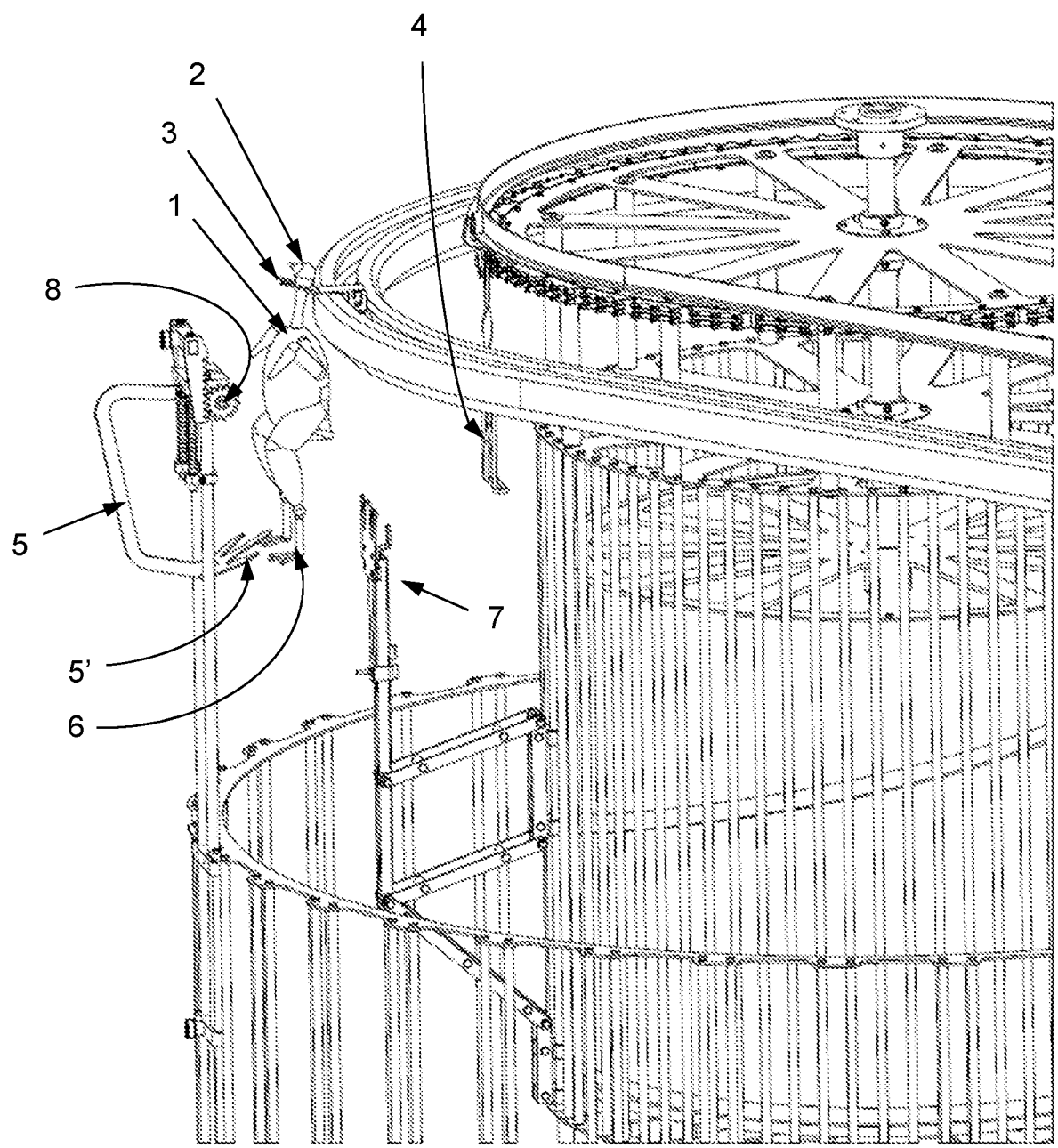
FIG. 1 shows an exemplary system of the invention for rehanging poultry, with such poultry to be rehanged.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

The operation of an exemplary system for rehanging poultry according to exemplary aspects of the invention is illustrated with reference to FIGS. 1 thru 9, which show a sequence of exemplary operations of different parts of the system.

FIG. 1 shows poultry 1 suspended by the head 2 in a first shackle 3 of a first shackle conveyor. This exemplary system of the invention is designed to rehang this poultry 1 into a position in which it will eventually be suspended by the legs from a second shackle 4 of a second shackle conveyor.

FIG. 1 shows that the system includes a leg positioning unit 5 in a not yet operational position. FIG. 1 clearly shows that the leg positioning unit 5 includes a hook 5' arranged to engage the legs 6 of the poultry 1 while suspended by the head 2.

Figure 2:
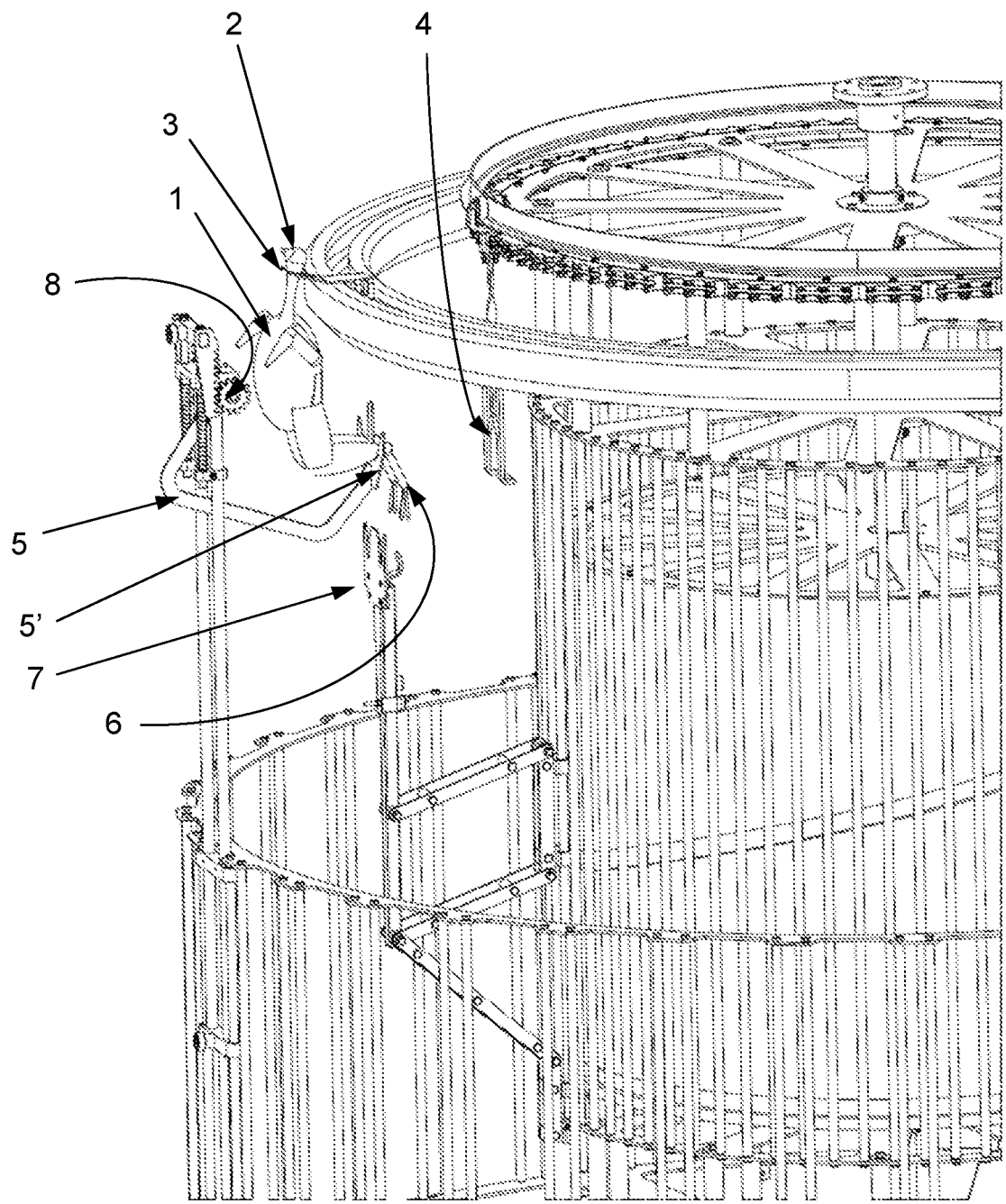
FIG. 2 shows an exemplary operation of a leg positioning unit forming part of the exemplary system of the invention.

In FIG. 2 the leg positioning unit 5 is shown after it has become operational and has engaged the legs 6 of the poultry 1. FIG. 2 shows that the exemplary leg positioning unit 5 is arranged to support the poultry 1 at the legs 6 while the poultry 1 is maintained suspended by the head 2 in the first shackle 3 of the first shackle conveyor.

FIG. 1 and FIG. 2 show that the leg positioning unit 5 is mounted on a hinge 8 which arranges that the hook 5' of the leg positioning unit 5 follows an essentially circular path in approaching the legs 6 of the poultry 1 wherein it eventually engages the legs 6 of the poultry 1. The circular path terminates at a position where the legs 6 of the poultry 1 extend obliquely or sideways away from where the poultry 6 is suspended by the head 2. This last aspect is also shown in FIG. 2.

Figure 3A:
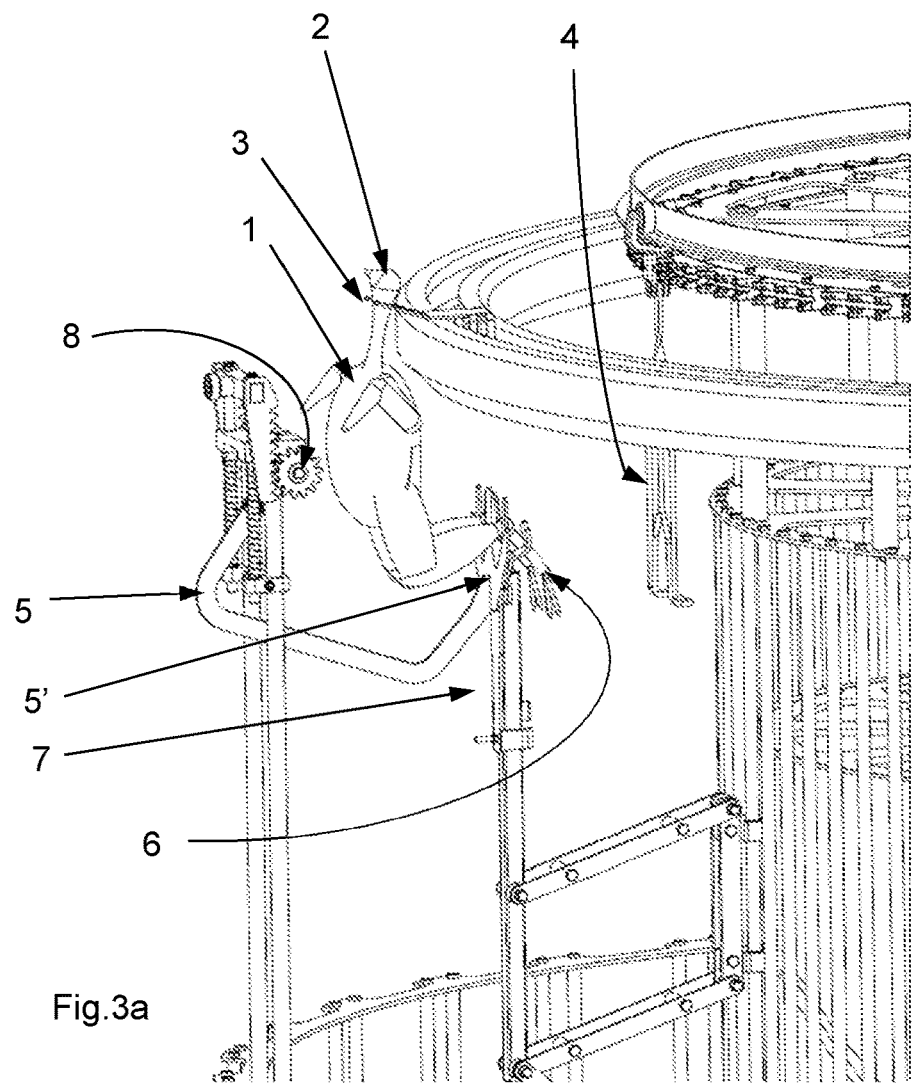
FIG. 3A shows the exemplary operation of an exemplary movable takeover unit engaging the poultry legs.
Figure 3B:
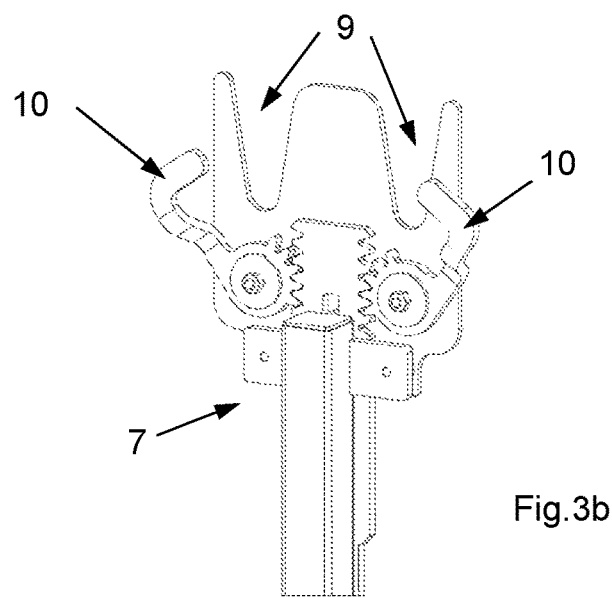
FIG. 3B shows the exemplary movable takeover unit in an isometric view.
Figure 4:
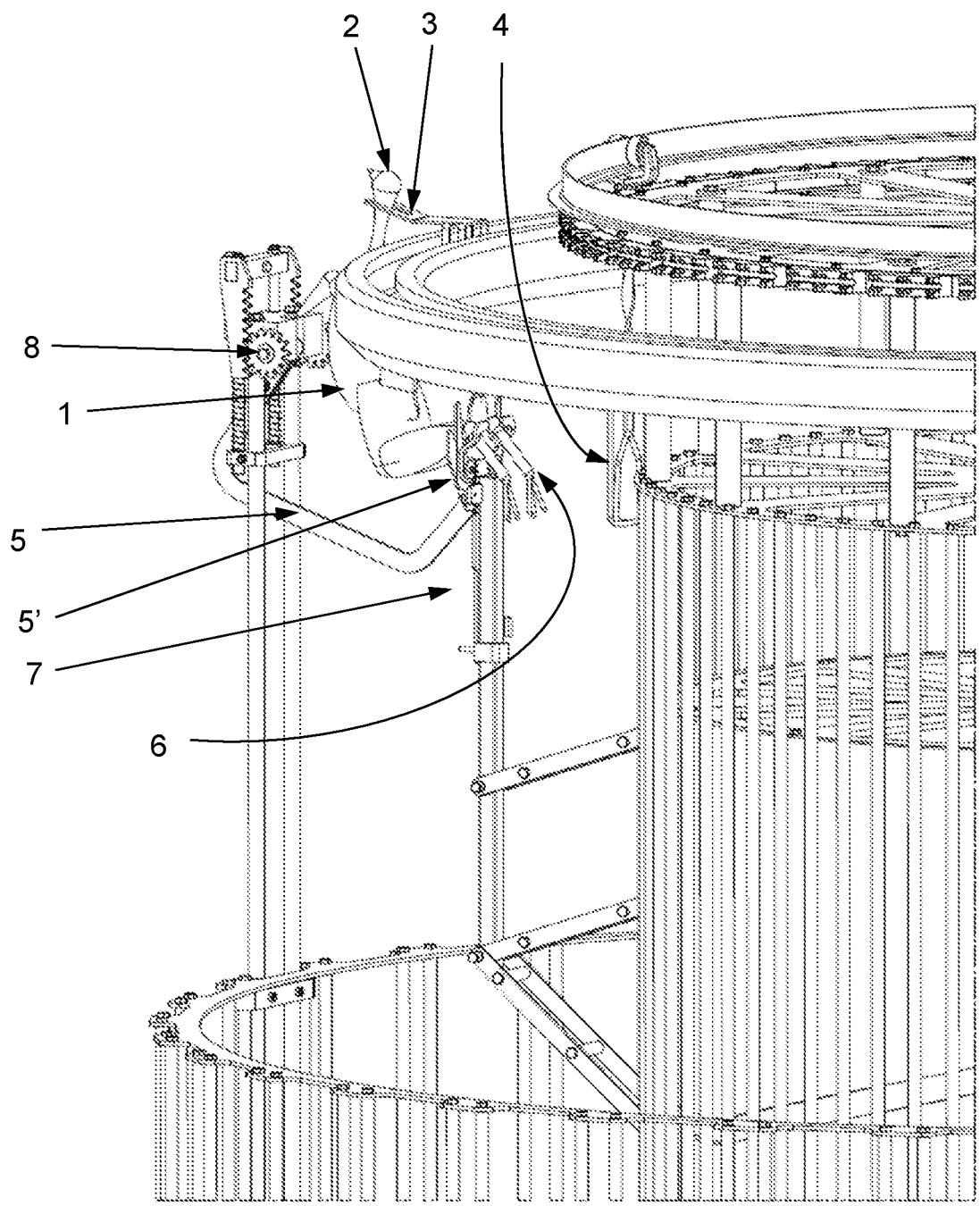
FIG. 4 shows the movable takeover unit with closed retaining elements to secure the legs of the poultry.

A movable takeover unit 7 which is designed to operate directly on the legs 6 of the poultry 1 as is shown in FIGS. 3A and 3B, is arranged to become operational after the leg positioning unit 5 supports the poultry 1 at the legs 6, as is shown in FIG. 2. Further, as will be explained hereinafter with reference to FIGS. 6-9, at least this movable takeover unit 7 of the exemplary system is movable independent from the leg positioning unit 5 towards a second shackle 4 of the second shackle conveyor in order to move the legs 6 of the poultry 1 into such second shackle 4 of the second shackle conveyor.

Before the motion of the previous paragraph is executed, the movable takeover unit 7 can be arranged to engage the legs 6 of the poultry 1 in an upward movement of the takeover unit 7 ending adjacent to where the leg positioning unit 5 engages the legs 6 of the poultry 1. For best results the leg positioning unit 5 and/or the movable take-over unit 7 can engage the legs 6 at or near the ankle at the ankle's front side, preferably above the ankle at a drum side of the legs 6, which is most clearly shown in FIG. 3A. Preferably, for this exemplary embodiment, the movable takeover unit 7 is engaging the legs 6 at a position which is more distant from the first shackle 3 where the poultry 1 is suspended by the head 2, than the distance of the leg positioning unit 5 to the first shackle 3 when the leg positioning unit 5 is engaging the legs 6 of the poultry 1.

With reference to FIG. 3B, it is shown that the movable takeover unit 7 is provided with slits 9 for receiving the legs 6 of the poultry 1. FIG. 3B further shows that the movable takeover unit 7 is provided with restricting elements 10 for preventing removal of the legs 6 from the first slits 9 after the movable takeover unit 7 has engaged the legs 6 of the poultry 1 and received the legs 6 in the slits 9. These restricting elements 10 are activated to prevent removal of the legs 6 from the first slits 9 before the moment that the first shackle 3 from which the poultry 1 is suspended by the head 2 releases the head 2, causing the poultry 1 to flip over and become suspended by the legs 6 only from the movable takeover unit 7. This is depicted in FIG. 5.

Figure 5:
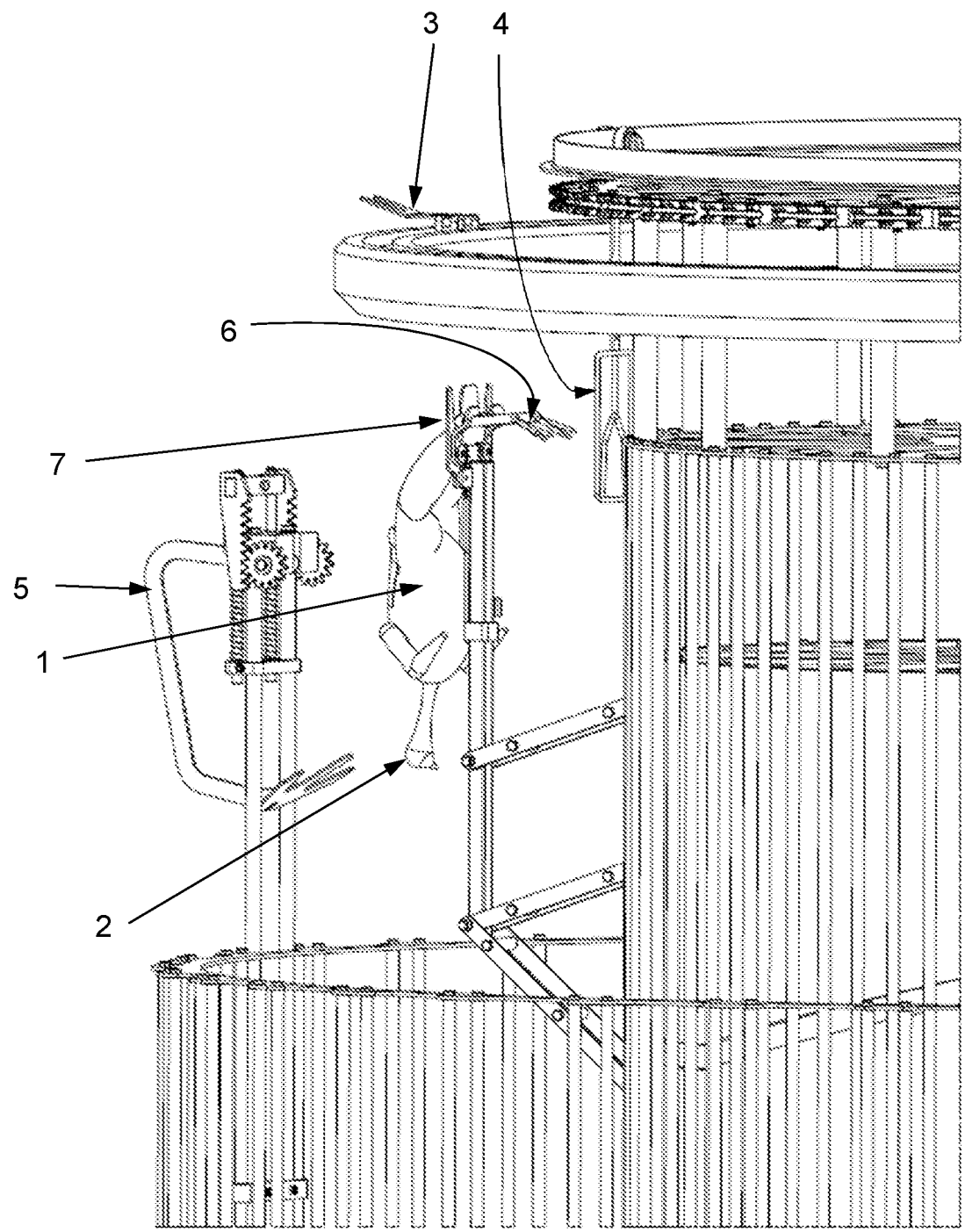
FIG. 5 shows the poultry with the head released and suspended by the legs from the movable takeover unit.
Figure 6:
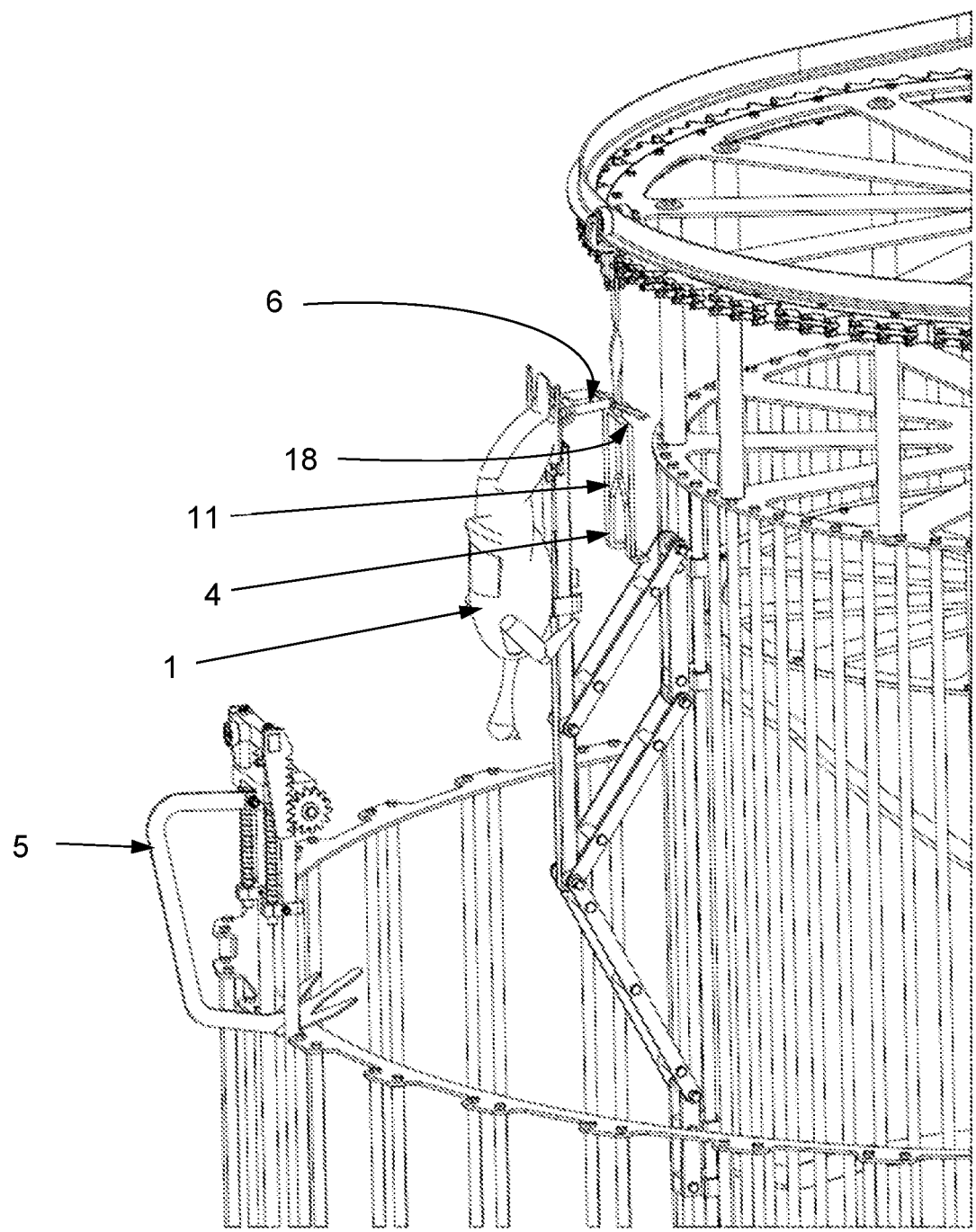
FIG. 6 shows the exemplary movable takeover unit after approaching the shackle from which the poultry will be suspended from the legs, wherein the legs extend above an upper part of the shackle.
Figure 7:
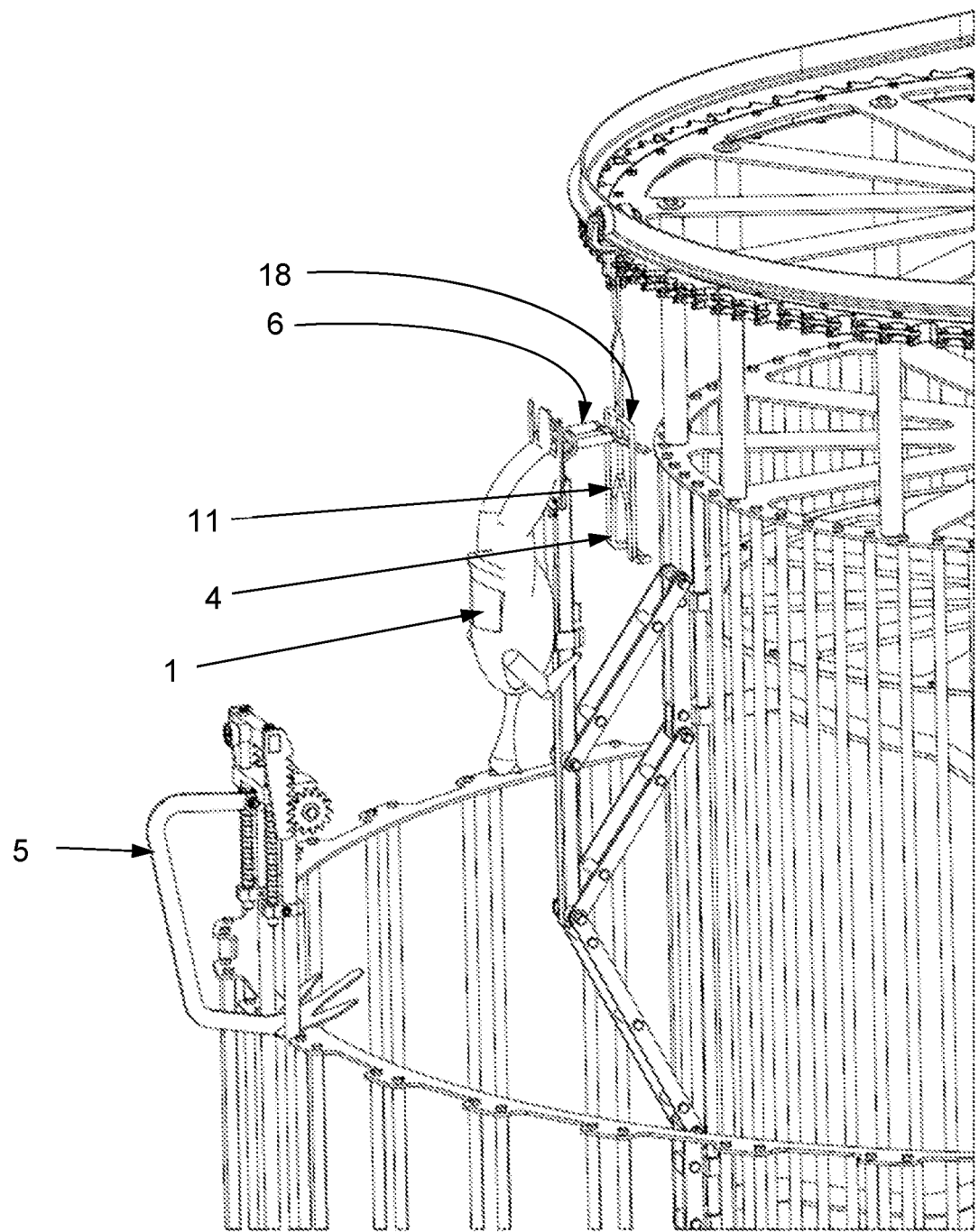
FIG. 7 shows the exemplary movable takeover unit in a downward moved position by which the poultry legs are introduced into the shackle of FIG. 6.

From then on, the exemplary movable takeover unit 7 can be arranged to move the legs 6 of the poultry 1 towards the second shackle 4 of the second shackle conveyor in a preferably essentially horizontal motion, which is illustrated by comparing the sequence of FIGS. 5-7. FIG. 6 depicts that the movable takeover unit 7 has approached the second shackle 4, wherein in the situation of FIG. 6 the feet of the legs 6 have reached a point lying above the second shackle 4. As is common for shackles for suspending poultry 1 by the legs 6, the second shackle 4 is provided with essentially vertical slits 11 for receiving and retaining the legs 6 of the poultry 1; this will hereinafter be further illustrated with reference to FIGS. 10 and 11.

Figure 8:
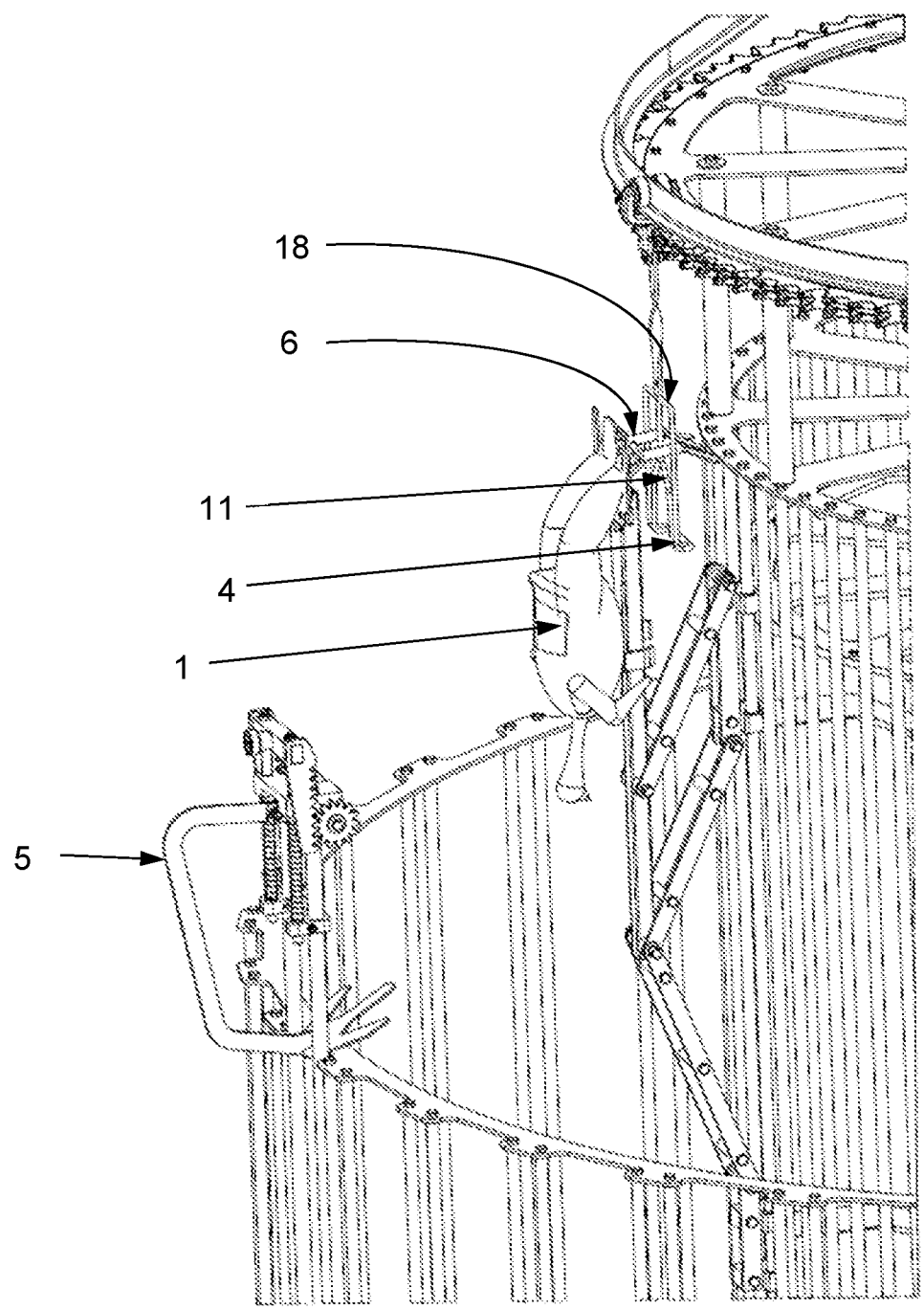
FIG. 8 shows the exemplary movable takeover unit in a further downward moved position after the poultry legs are introduced into the shackle of FIG. 6.
Figure 9:
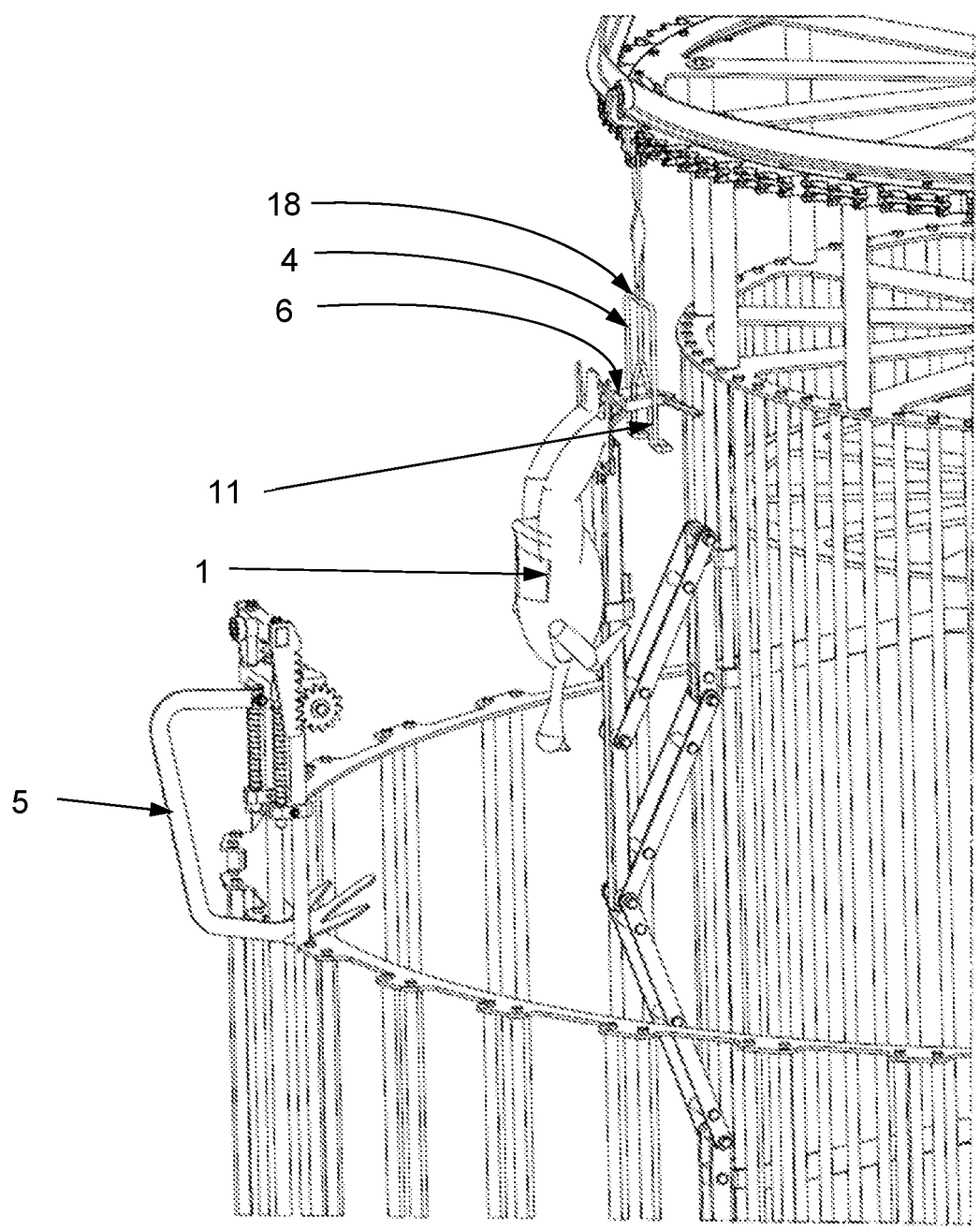
FIG. 9 shows the final position of the exemplary movable takeover unit before it is released from the poultry legs and moved away from the shackle of FIG. 6.

By comparing FIG. 6 and FIG. 7 it is shown that the exemplary movable takeover unit 7 is arranged to move downwards after the feet of the legs 6 have reached a point lying above the second shackle 4, as depicted in FIG. 6 wherein the movable takeover unit 7 has moved the legs 6 of the poultry 1 closely near to and above the second shackle 4 of the second shackle conveyor. With the subsequent downward movement of the movable takeover unit 7, the legs 6 of the poultry 1 are moved down such that the feet with the toes engage an upper bar 18 of the second shackle 4, prior to moving the toes to get into the second shackle 4 as depicted in FIG. 7. A comparison of FIGS. 7 and 8 shows that once the toes of the feet are placed into the second shackle 4, the movable takeover unit 7 moves the legs 6 further into the second shackle 4 in a continued downward movement for retainment of the legs 6 down into the essentially vertical slits 11 of the second shackle 4. FIG. 9 finally illustrates the movable takeover unit 7 immediately prior to the removal of the movable takeover unit 7, after which the poultry 1 will be entirely suspended by the legs 6 from the second shackle 4 of the second shackle conveyor.

Figure 10:
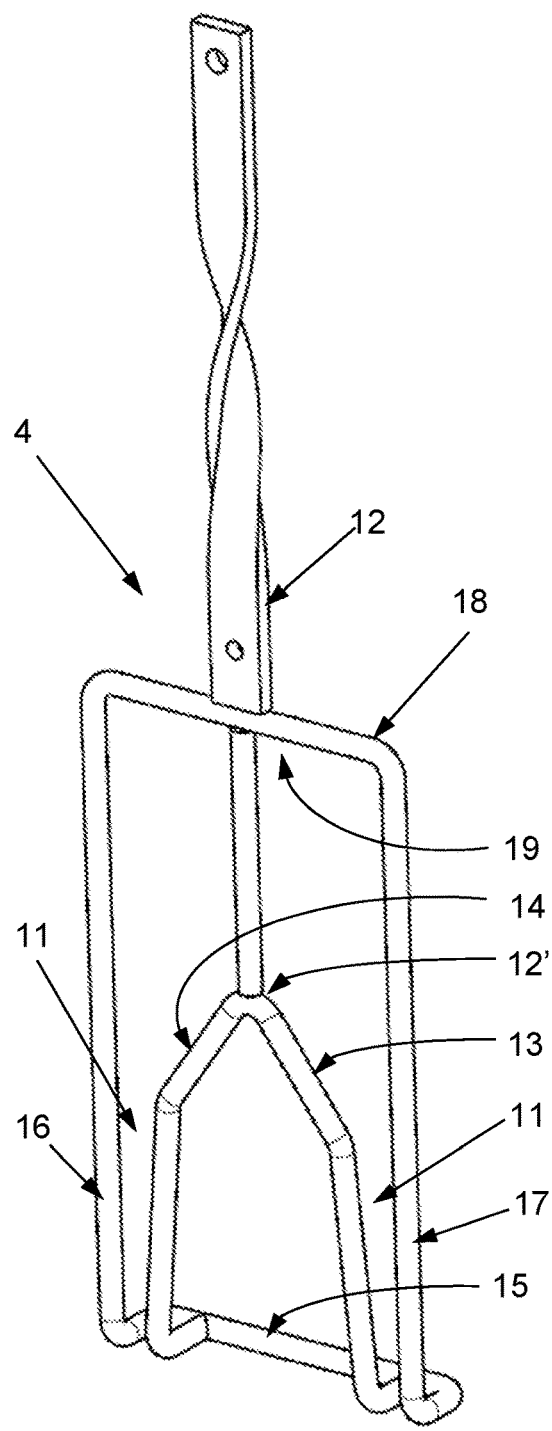
FIG. 10 shows a conventional shackle for suspending the poultry by the legs.

It is possible to use a conventional shackle 4 as shown in FIG. 10 in the above explained exemplary rehanging method. Such a conventional shackle 4 includes a central vertical bar 12, wherein on a lower end 12' of the central vertical bar 12 and connected to the central vertical bar 12, two first rods 13, 14 diverge away from each other and connect to a lower horizontal rod 15 distant from the central bar 12, wherein on opposite ends of the lower horizontal rod 15, the horizontal rod 15 bends into two upwardly extending second rods 16, 17 that eventually connect to the central vertical bar 12, and wherein the two first rods 13, 14 and the two second rods 16, 17 delimit and define slits 11 between the two first rods 13, 14 and the two second rods 16, 17 for receiving and retaining the legs 6 of poultry 1 suspended by the legs 6 from this second shackle 4.

Figure 11:
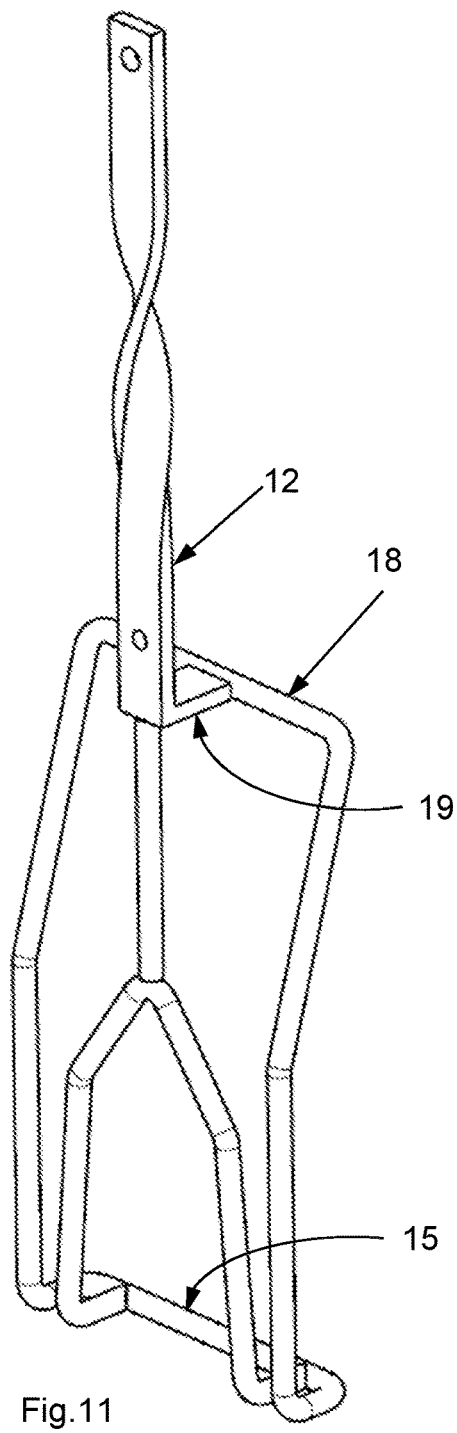
FIG. 11 shows an exemplary shackle according to an exemplary embodiment of the invention.

Advantageously a shackle according to the design as shown in FIG. 11 can be used. The shackle according to FIG. 11 has the same features as the conventional shackle 4 which is shown in FIG. 10, but has the additional and differentiating feature that the two upwardly extending second rods 16, 17 merge into an upper horizontal rod 18 distant from the lower horizontal rod 15, which upper horizontal rod 18 is fixed in position at a predetermined distance from the central vertical bar 12. For this purpose, the upper horizontal rod 18 can be connected to the central vertical bar 12 with an intermediate connection piece 19. With the second shackle 4 of FIG. 11 it is easier to move the legs 6 of the poultry 1 down into the slits 11 of the second shackle 4 after the feet of the legs 6 have reached a point lying above the second shackle 4, as depicted in FIG. 6, in a single downward movement.

Embodiments of the present invention can include every combination of features that are disclosed herein independently from each other. Although the invention has been discussed in the foregoing with reference to an exemplary embodiment of the system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Figure 14:
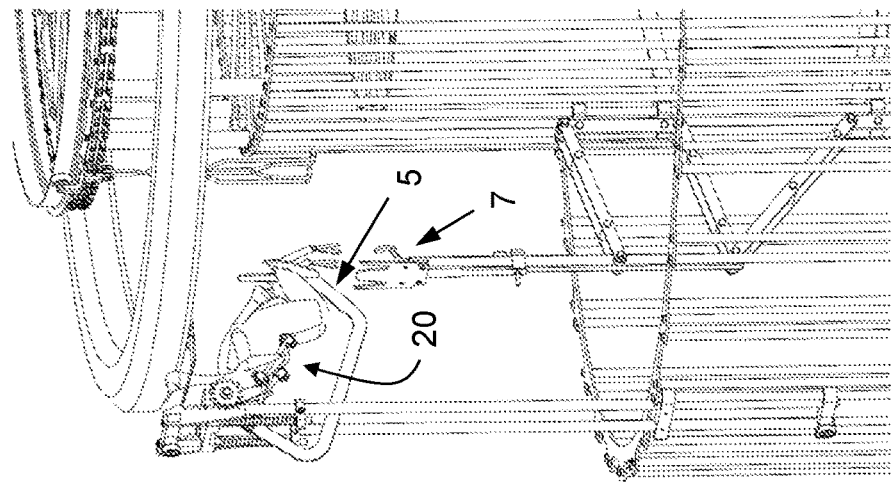
FIGS. 12-14 show several subsequent stages of movement of the exemplary movable takeover unit in a different exemplary embodiment of the system of the invention which is equipped with a dedicated breast support for the poultry.
Figure 13:
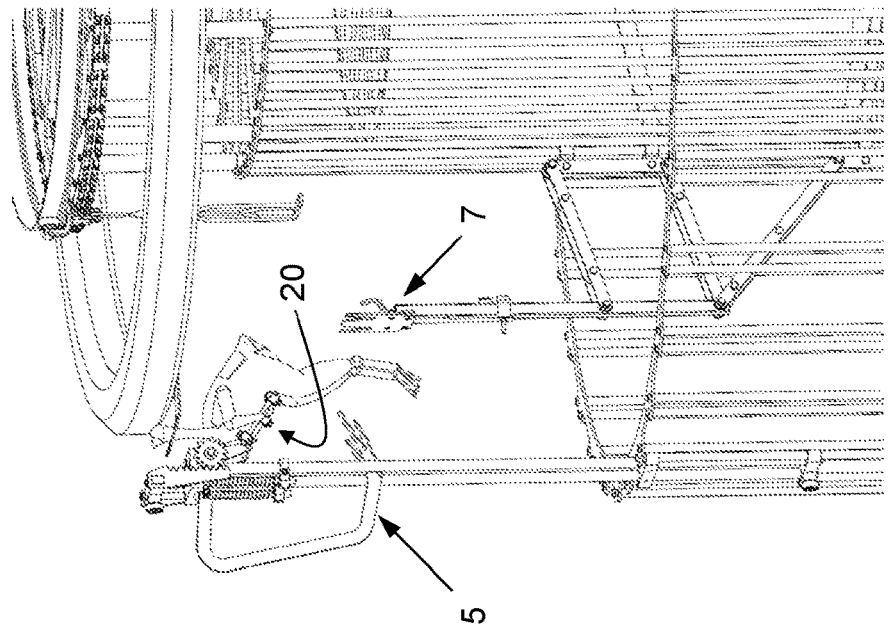
Figure 12:
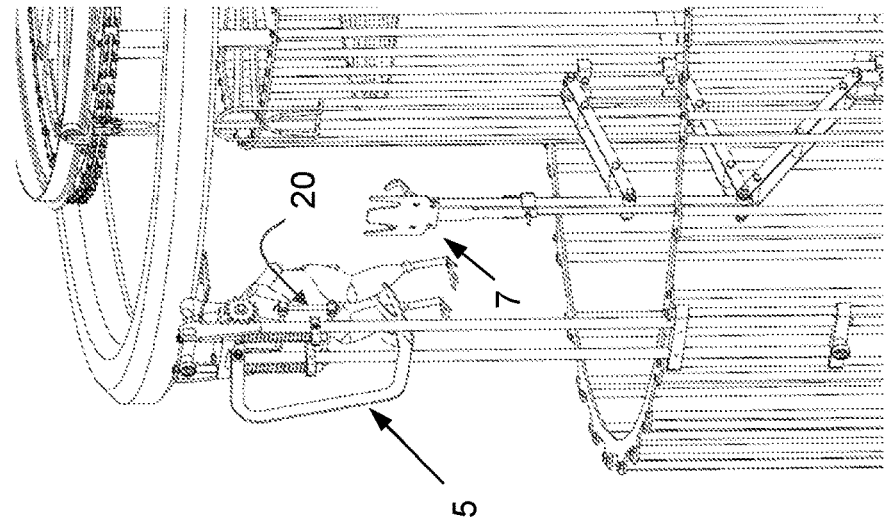

Variations and modifications of the present invention will be obvious to those skilled in the art and it is intended to cover in the appended claims all such modifications and equivalents. One such possible variation or modification is depicted in FIGS. 12-14, which in addition to the embodiment of FIGS. 1-3 also show a breast support 20 for the poultry 1. The FIGS. 12-14 shows several subsequent stages of movement of the leg positioning unit 5 and the movable takeover unit 7, wherein also the breast support 20 assumes different positions to assist in supporting the poultry 1 during the rehanging operation.

The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A system for rehanging poultry that is suspended by the head in a first shackle of a first shackle conveyor to a second shackle of a second shackle conveyor in which the poultry is or will be suspended by the legs, the system comprising
a leg positioning unit arranged to support the poultry at the legs while the poultry is maintained suspended by the head in the first shackle of the first shackle conveyor; and
a movable takeover unit that is movable towards the second shackle of the second shackle conveyor for moving the legs of the poultry into the second shackle of the second shackle conveyor, wherein the movable takeover unit is arranged to be operational at least when the leg positioning unit supports the poultry at the legs, wherein the movable takeover unit is independently and separate from the leg positioning unit movable towards the second shackle of the second shackle conveyor and is arranged to act directly on the legs of the poultry to move the legs of the poultry into the second shackle of the second shackle conveyor.

2. The system of claim 1, wherein the leg positioning unit comprises a hook arranged to engage the legs of the poultry while being suspended by the head.

3. The system of claim 2, wherein the hook of the leg positioning unit is arranged to follow an essentially circular path in approaching the legs to eventually engage the legs of the poultry, which circular path terminates at a position where the legs of the poultry extend obliquely or sideways away from where the poultry is suspended by the head.

4. The system of claim 1, wherein the movable takeover unit is arranged to engage the legs of the poultry in an upward movement of the takeover unit ending adjacent to where the leg positioning unit engages the legs of the poultry.

5. The system of claim 1, wherein the leg positioning unit, the movable takeover unit, or both, engage the legs of the poultry at or near the ankle at the ankle's front side.

6. The system of claim 5, wherein the movable takeover unit is engages the legs at a position that is more distant from the first shackle where the poultry is suspended by the head than the distance of the leg positioning unit to the first shackle when the leg positioning unit is engaging the legs of the poultry.

7. The system of claim 1, wherein the movable takeover unit is provided with first slits for receiving therein the legs of the poultry.

8. The system of claim 7, wherein the movable takeover unit is provided with restricting elements for preventing removal of the legs from the first slits.

9. The system of claim 1, wherein the system is arranged to release the head from the first shackle after the movable takeover unit has engaged the legs of the poultry.

10. The system of claim 9, wherein the system is arranged to release the head from the first shackle after the restricting elements of the movable takeover unit are actuated to prevent removal of the legs from the first slits in which the legs of the poultry are received.

11. The system of claim 1, wherein the movable takeover unit is arranged to move the legs of the poultry towards the second shackle of the second shackle conveyor in an essentially horizontal motion.

12. The system of claim 1, further comprising:
the second shackle conveyor with the second shackle in which the poultry is or will be suspended by the legs;
wherein the second shackle is provided with essentially vertical second slits for receiving and retaining the legs of the poultry, wherein the movable takeover unit is arranged to move downwards after the movable takeover unit with the legs of the poultry has been moved towards the second shackle of the second shackle conveyor, so as to move the legs for their retainment down into the essentially vertical second slits of the second shackle.

13. The system of claim 12, wherein the second shackle comprises an upper horizontal rod distant from and above the second slits, wherein the movable takeover unit is arranged to move the feet extending from the legs above and beyond the upper horizontal rod, and then to move the legs downwards so that the feet engage the upper horizontal rod and the toes of the feet are moved into the second shackle prior to movement of the legs into the essentially vertical second slits of the second shackle.

14. The system of claim 13, wherein the movable takeover unit is arranged to move the legs in the downward movement into the second slits once the toes are arranged into the second shackle.

15. The system of claims 14, wherein the second shackle comprises a central vertical bar, wherein on a lower end of the central vertical bar and connected to the central vertical bar, two first rods diverge away from each other and connect to a lower horizontal rod distant from the central bar, wherein on opposite ends of the lower horizontal rod, the horizontal rod bends into two upwardly extending second rods that eventually connect to the central vertical bar, and wherein the two first rods and the two second rods delimit and define slits between the two first rods and the two second rods for receiving and retaining the legs of poultry suspended by the legs from the second shackle, wherein the two upwardly extending second rods merge into the upper horizontal rod distant from the lower horizontal rod, which upper horizontal rod is fixed in position at a predetermined distance from the central vertical bar.

16. The system of claim 15, wherein the upper horizontal rod is connected to the central vertical bar with an intermediate connection piece.

17. The system according to claim 1, wherein the system includes a breast support for supporting the poultry before the leg positioning unit supports the poultry at the legs.

18. A method for rehanging poultry that is suspended by the head in a first shackle of a first shackle conveyor to a second shackle of a second shackle conveyor in which the poultry is or will be suspended by the legs, wherein the poultry is supported at the legs while the poultry is maintained suspended by the head in the first shackle of the first shackle conveyor, the method comprising:
  engaging the legs of the poultry with a movable takeover unit acting directly on the legs when the poultry is supported at the legs; and
  moving the movable takeover unit that acting directly on the legs towards the second shackle of the second shackle conveyor to move the legs of the poultry into the second shackle of the second shackle conveyor.

19. The method according to claim 18, further comprising supporting the poultry at the legs, engaging the legs, or both, with the movable takeover unit above the ankle at a drum side of the legs.

20. The method according to claim 19, further comprising releasing the head of the poultry after the movable takeover unit has engaged the legs of the poultry.

21. The method according to claim 20, further comprising moving the movable takeover unit downwards after the movable takeover unit has moved the legs of the poultry above the second shackle of the second shackle conveyor, so as to move the legs for their retainment down into the second shackle.

* * * * *